(12) United States Patent
Krieger et al.

(10) Patent No.: US 7,564,223 B2
(45) Date of Patent: Jul. 21, 2009

(54) HIGH FREQUENCY BATTERY CHARGER AND METHOD OF OPERATING SAME

(75) Inventors: Michael Krieger, Miami Beach, FL (US); Bruce Randolph, Ft. Lauderdale, FL (US); Roy Scott Vetitoe, Nashville, TN (US)

(73) Assignee: Black & Decker Inc., Newark, DE (US)

( * ) Notice: Subject to any disclaimer, the term of this patent is extended or adjusted under 35 U.S.C. 154(b) by 404 days.

(21) Appl. No.: 11/212,880

(22) Filed: Aug. 29, 2005

(65) Prior Publication Data

US 2006/0001401 A1    Jan. 5, 2006

Related U.S. Application Data

(60) Division of application No. 10/963,783, filed on Oct. 14, 2004, which is a continuation of application No. 10/270,391, filed on Oct. 15, 2002, now Pat. No. 6,822,425.

(60) Provisional application No. 60/350,897, filed on Jan. 25, 2002, provisional application No. 60/363,302, filed on Mar. 11, 2002.

(51) Int. Cl.
    *H02J 7/04* (2006.01)
(52) U.S. Cl. ................. 320/139; 320/129; 320/128; 324/426; 324/433; 324/427; 324/429

(58) Field of Classification Search ............. 320/129, 320/128, 139; 324/426, 433, 427, 429
    See application file for complete search history.

(56) References Cited

U.S. PATENT DOCUMENTS

| 3,679,964 A | 7/1972 | Nowell |
| 4,260,943 A | 4/1981 | Zaderej et al. |
| 4,472,672 A | 9/1984 | Pacholok |

(Continued)

FOREIGN PATENT DOCUMENTS

EP        0 126 936       12/1984

(Continued)

OTHER PUBLICATIONS

"Vector VEC074 Start-It 2/10/55 Amp Automatic Battery Charger", http://www.directdepot.net/product_info.php?products_id=884, printed on Jul. 21, 2005.

(Continued)

*Primary Examiner*—Akm E Ullah
*Assistant Examiner*—Nguyen Tran
(74) *Attorney, Agent, or Firm*—Harness, Dickey & Pierce, P.L.C.

(57) ABSTRACT

A high frequency battery charger for charging a target battery is provided. The battery charger includes a charging circuit including a high frequency transformer, a switch switching the high frequency transformer, a filter coupled to the high frequency transformer for passing a DC voltage signal and a controller providing a high frequency driving signal to the switch. Measuring circuitry measures at least one of a voltage or a current at the target battery. A microprocessor receives the measured voltage or current and calculates diagnostics of the target battery based on at least one of the measured voltage or current.

18 Claims, 9 Drawing Sheets

U.S. PATENT DOCUMENTS

| | | | |
|---|---|---|---|
| 4,710,694 A * | 12/1987 | Sutphin et al. | 320/139 |
| 4,742,290 A | 5/1988 | Sutphin et al. | |
| 4,871,959 A | 10/1989 | Gali | |
| 5,043,650 A | 8/1991 | Bhagwat et al. | |
| 5,063,341 A | 11/1991 | Gali | |
| 5,166,595 A | 11/1992 | Leverich | |
| 5,276,393 A | 1/1994 | Gali | |
| 5,440,179 A | 8/1995 | Severinsky | |
| 5,442,274 A | 8/1995 | Tamai et al. | |
| 5,510,694 A | 4/1996 | Nilssen | |
| 5,523,671 A * | 6/1996 | Stewart | 320/152 |
| 5,633,575 A | 5/1997 | Gali | |
| 5,659,237 A | 8/1997 | Divan et al. | |
| RE35,643 E | 10/1997 | Gali | |
| 5,684,686 A | 11/1997 | Reddy | |
| 5,710,506 A * | 1/1998 | Broell et al. | 320/145 |
| 5,790,391 A | 8/1998 | Stich et al. | |
| 5,796,238 A * | 8/1998 | Hiratsuka et al. | 320/112 |
| 5,998,968 A | 12/1999 | Pittman et al. | |
| 6,118,254 A | 9/2000 | Faulk | |
| 6,137,280 A | 10/2000 | Ackermann et al. | |
| 6,204,639 B1 | 3/2001 | Takano et al. | |
| 6,211,577 B1 | 4/2001 | Alksnat et al. | |
| 6,252,373 B1 | 6/2001 | Stefansson et al. | |
| 6,359,442 B1 | 3/2002 | Henningson et al. | |
| 6,363,303 B1 | 3/2002 | Bertness | |
| 6,370,039 B1 | 4/2002 | Telefus | |
| 6,388,425 B1 | 5/2002 | Petrovic et al. | |
| 6,580,990 B2 * | 6/2003 | Wager et al. | 701/43 |
| 6,731,096 B1 * | 5/2004 | Patino et al. | 320/137 |
| 6,822,425 B2 | 11/2004 | Krieger et al. | |
| 2004/0000893 A1 * | 1/2004 | Raichle et al. | 320/135 |

FOREIGN PATENT DOCUMENTS

| | | |
|---|---|---|
| JP | 9-289772 | 11/1997 |
| JP | 10-309394 | 11/1998 |
| JP | 2000 308348 | 11/2000 |
| WO | WO-02/01694 A2 | 1/2002 |
| WO | WO-2004/036714 A3 | 4/2004 |

OTHER PUBLICATIONS

"Husky Husky 2/10/55 AMP Auto Batter Charger", http://www.homedepot.com/pre180/HDUS/EN_US/shop_cart/pg_print_products.jsp?CNTT..., printed Jul. 21, 2005.

"DieHard 2/12/75 amp Automatic Battery Charger", http://www.sears.com/sr/javasr/printProduct.do?BV_UseBVCookie=Yes&vertical=AUTO..., printed Jul. 21, 2005.

"DieHard 15/2/100 amp Automatic Battery Charger", http://www.sears.com/sr/javasr/printProduct.do?BV_UseBVCookie=Yes&vertical=AUTO..., printed Jul. 21, 2005.

"Battery Chargers>>SpeedChargers™", http://www.batterychargers.com/itemlist.cfm?cid=2, printed Jul. 21, 2005.

"Switch Mode Power Supplies", file://F:\Switch%20Mode%20Power&20Supplies.htm, printed on Jul. 22, 2005.

Owners manual for Schumacher/Sears Model No. 200.71465, Apr. 1996.

Operator's Manual for Century Manufacturing Manual Wheel Charger and Automatic Wheel Charger, Jun. 2000.

Owner's Manual for Schumacher Model 9275A-PE, Apr. 2001.

Powerpulse Battery Maintenance System documentation, Oct. 2001.

"Evaluation: NFA (New Focus Always) Model 7005 10A High Frequency Battery Charger", Schumacher Electric Corporation.

Owner's Manual for Statpower Truecharge 20+/40+ Multi-Stage Battery Charger, copyright 1999, p. 2-35.

A schematic of a Statpower Technolgies Corporation Truecharge 40+ Multi-Stage Battery Charger based on a 1999 (or earlier) unit.

A schematic of the NFA 7006 high frequeny battery charger, based on a charger recived by Schumacher from NFA on or about Oct. 2001.

"UL Standard for Safety for Battery Chargers for Charging Engine-Starter Batteries, UL 1236, Fifth Edition", Jun. 28, 1994.

Schilling, Scott, "Ensuring Lead-Acid Battery Performance with ReNew-IT Pulse Technology", PulseTech Products Corporation, May 16, 2001.

Xantrex Truecharge™ 10 Battery Charger (TC10) Owner's Manual, Revision 3, Nov. 2002, www.xantrex.com.

Xantrex Truecharge 20+/40+ Amp Multi-Stage Battery Charger Owner's Guide, Revision 5, Nov. 2002, www.xantrex.com.

"Statpower Truecharge Smartest of the Smart Battery Chargers", Powerboat Reports, pp. 8-13, May 1996.

International Search Report issued in PCT Application No. PCT/US2003/018746, mailed on May 4, 2003.

* cited by examiner

HIGH FREQUENCY BATTERY CHARGER AND METHOD OF OPERATING SAME

CROSS-REFERENCE TO RELATED APPLICATIONS

This application is a divisional of U.S. application Ser. No. 10/963,783 filed Oct. 14, 2004, which claims priority from U.S. application Ser. No. 10/270,391, now U.S. Pat. No. 6,822,425, which in turn claims priority from U.S. Provisional Application Nos. 60/350,897 filed Jan. 25, 2002 and 60/363,302 filed Mar. 11, 2002. The contents of all four priority applications are incorporated herein by reference.

BACKGROUND OF THE INVENTION

1. Field of the Invention

The present invention relates to a battery charger or booster and in particular to a high frequency charger.

2. Technical Background

Dual-mode battery chargers currently exist. When operated in a first mode, the battery charger delivers a high current output for a short duration of time. This short duration, high current can be used to jump-start a vehicle with a dead battery. In a second mode, the battery charger provides a low current output that is used to charge the battery back to its full charge. Known dual-mode battery chargers typically use a single large transformer to achieve the dual-mode capability. The single transformer is usually a linear type transformer. A tap of a primary winding of the transformer is changed in order to achieve the dual capability with the linear-type transformer. As the tap of the transformer is changed, the output voltage, and hence, according to Ohm's Law, the output current of the transformer is changed, resulting in the dual-mode capability. Use of a single transformer for both modes of operation has the advantage of being very cost-efficient and very effective.

However, this approach also has several disadvantages. One of the disadvantages is that known single transformer battery chargers are very large and cumbersome. Standard linear transformers require iron for their cores, adding to the weight of the battery charger. They also require orders of magnitude more wire to form their windings than do high frequency chargers, again adding to the weight of the battery charger.

Additionally, although the linear transformer can provide a high current output, the high current output can only be provided for a very short period of time. As the transformer operates in high current mode, it generates an excessive amount of heat. In fact, so much heat may be generated that the transformer actually melts down. If a meltdown occurs, the transformer will not operate in either the high current mode or the low current mode. Linear transformers are also very lossy in terms of magnetic losses and eddy current losses, resulting in inefficiency.

Further, to charge an automobile battery that is of insufficient electric power by providing power from another power source, like a battery charger, the power source and the battery must be connected through a pair of electric wires, typically having clamps at their ends for connection to the battery. Making this connection can be very dangerous if there is a problem with the connection. For example, it is well known that sparking or arcing often occurs when a connection is being attempted between a battery charger and a battery. Additionally, sparking or arcing may occur when the clamps are connected to the battery with a reverse polarity. Sparking or arcing can also occur even after an apparently good connection is made. The sparking or arcing may occur due to corroded or poor terminal connections.

In the past, the use of a delay circuit or "soft start" was used to prevent sparking. A delay circuit prevents power flow to the battery from occurring until a connection is made between the battery and the battery charger. This method helps to prevent sparking upon the initial connection of the battery and battery charger. However, it does not prevent any sparking that occurs as a result of poor or corroded connections, the existence of which can only be determined after current flow begins. Sparking or arcing may result in damage to the battery, and under certain circumstances, an explosion, fire and damage to the vehicle or to a person may result.

Additionally, a characteristic of liquid electrolyte type batteries, particularly lead acid batteries used in vehicles, is that chemical compound deposits slowly build up on the plates to partially or entirely cover and displace the normal plate surfaces. Low current recharging is inadequate in that it can not, as such, sufficiently remove such deposits that with the passage of time crystallize and choke the battery plates by interfering with electrolyte movement. When this occurs a battery may still appear to have taken a charge and even the electrolyte may check as being correct, but the battery does not hold the charge because the plates are effectively shorted. Batteries using other electrolytes also face reclaiming, maintenance and charging problems that need to be successfully addressed.

Thus, there is a need for a method to release the deposits that are built up on the plate surfaces, where the deposits may either go back into the solution or be broken up. There is also a need for a simple and lightweight dual-mode battery charger. The battery charger should be able to provide a high current output that is sufficient to start an automobile or other vehicle with a dead battery, yet be easy to construct and safe to operate.

DEFINITIONS

In describing the invention, the following definitions are applicable throughout this application.

A "computer" refers to any apparatus that is capable of accepting a structured input, processing the structured input according to prescribed rules, and producing results of the processing as output. Examples of a computer include a computer; a general-purpose computer; a supercomputer; a mainframe; a super mini-computer; a mini-computer; a workstation; a microcomputer; a processor; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include a magnetic hard disk; a floppy disk; an optical disk, like a CD-ROM or a DVD; a magnetic tape; a memory chip (e.g., ROM or RAM); and a carrier wave used to carry computer-readable electronic data, such as those used in transmitting and receiving e-mail or in accessing a network.

"Software" refers to prescribed rules to operate a computer. Examples of software include software; code segments; instructions; computer programs; and programmed logic.

A "computer system" refers to a system having a computer, where the computer comprises a computer-readable medium embodying software to operate the computer.

SUMMARY OF THE INVENTION

According to an embodiment of the invention, a high frequency charger for charging a battery is provided. The charger comprises a charge circuit including a first high frequency transformer. A first switch switches the first high frequency transformer at a first frequency. The charger also includes means for measuring a charge rate of the battery; means for determining an amount of time the battery has been charging; means for measuring a voltage of the battery; and means for detecting an overtime fault if the charge rate is greater than a predetermined current, the battery has been charging longer than a predetermined amount of time, and the voltage of the battery is greater than or equal to a predetermined voltage.

In another embodiment, the high frequency charger comprises: a charge circuit including a first high frequency transformer; a first switch switching the first high frequency transformer at a first frequency; means for measuring a charge rate of the battery; means for determining an amount of time the battery has been charging; means for measuring a voltage of the battery; and means for detecting a shorted cell battery fault if the charge rate is greater than a predetermined current, the battery has been charging more a predetermined amount of time, and the voltage of the battery is less than or equal to a predetermined voltage.

In another embodiment, the high frequency charger for charging a battery comprises a charge circuit including a first high frequency transformer; a first switch switching the first high frequency transformer at a first frequency; clamps for connecting the charger to the battery; means for measuring a voltage at the clamps; means for indicated a bad battery fault if no voltage is detected at the clamps.

In another embodiment, the high frequency charger comprises a charge circuit including a first high frequency transformer; a first switch switching the first high frequency transformer at a first frequency; means for measuring a charge current of the battery; means for determining an amount of time the battery has been charging; means for measuring a voltage of the battery; and means for detecting an open cell battery fault if the charge current is less than a predetermined current, the battery has been charging more a predetermined amount of time, and the voltage of the battery is greater than or equal to a predetermined voltage.

According to an embodiment of the invention, there is provided a high frequency charger that includes a charge circuit and a boost circuit. In a preferred embodiment, the charge circuit includes a first high frequency transformer. A switch switches this first high frequency transformer at a predetermined frequency. The boost circuit includes a second high frequency transformer that is separate from the first high frequency transformer in the charge circuit. The first and second high frequency transformers are operated in a similar manner. However, the boost circuit is adapted provide a high current that can be used to jump-start a vehicle with a depleted battery.

According to a variation on the preceding embodiment of the invention, there is provided a high frequency charger that includes a charge circuit and a boost circuit. In this embodiment, the charge circuit and the boost circuit are constructed using a single high frequency transformer having two windings on its primary side, a charge winding and a boost winding. The charge winding and the boost winding effectively form (along with the single secondary winding) the first and second high frequency transformers of the preceding embodiment of the invention (and may thus be thought of as the two separate transformers in other embodiments of the invention). The boost winding is adapted to provide a high current that can be used to jump-start a vehicle with a depleted battery.

In a preferred embodiment, a PWM controller provides a driving signal to the switch such that the transformer of the charge circuit is switched to output a pulse. The pulse output of the charge circuit can be used to condition the battery.

As noted, the transformer in the charge circuit and the transformer in the boost circuit are preferably separate from each other, that is, there are two transformers and associated circuits. Thus, the battery charger is not dependent on the same transformer for both standard charging and boosting. For example, if the transformer in a conventional charger burns out while performing a boost function, all the functionality of the charger may be lost, as one transformer is used for both functions. However, in the present embodiment, either of the transformers still operates even if the other transformer is disabled for some reason.

A control circuit for a high frequency charger is also provided. In an exemplary embodiment, the control circuit includes a pulse width modulation (PWM) controller having a reference voltage input, a control input, and an output for a control signal. A switch receives the control signal and is switched on and off in response to the control signal. A voltage divider network divides the voltage applied to the reference voltage input and the control input. A duty cycle of the control signal output from the PWM controller varies based on the percentage of the reference voltage that is applied to the control.

In a further embodiment, the voltage divider network comprises a first resistor having a first terminal connected to the reference voltage input and a second terminal connected to the control input. A plurality of second resistors each has a first terminal connected to the second terminal of the first resistor and a second terminal. A plurality of transistors are also provided, each having a first electrode connected to the second terminal of one of the second resistors, a second electrode that is grounded, and a third electrode receiving an enable signal. The enable signal turns the transistors on and off, selectively connecting one of the second resistors to ground.

In another embodiment, a method for reducing arcing in a battery charger comprises: providing a test current that is lower than a charging current from the battery charger to a battery; detecting if the test current is present at the battery; if the test current is not detected at the battery, indicating a fault; and if the test current is detected at the battery, increasing the test current a predetermined amount and returning to the detecting step.

According to another aspect of the invention there is provided a computer-readable storage medium for use with a computer for controlling a high frequency charger including a charge circuit having a first high frequency transformer; a first switch switching the first high frequency transformer at a predetermined frequency for producing a charge signal in a first mode of operation; the charge circuit operating in at least one of a pulse mode and a charge mode; and a selector for selecting one of the charge mode and the pulse mode, the computer-readable information storage medium storing computer-readable program code for causing the computer to perform the steps of: detecting a selected mode of operation for the charger; and when a pulse mode is selected, a) generating a driving signal for the first switch for a first period of time; b) disabling the first switch for a second period of time; and c) returning to step a).

According to yet a further aspect of the invention, there is provided a computer-readable information storage medium for use with a computer controlling a high frequency charger comprising a charge circuit including a high frequency transformer; and a switch switching the high frequency transformer at a predetermined frequency, the computer-readable information storage medium storing computer-readable program code for causing the computer to perform the steps of: checking a flag indicating the battery is in a bulk charge state or an absorption charge state; if the battery is in the bulk charge state, increasing a duty cycle of a driving signal for the first switch if a current provided by the battery charger is less than a desired current; decreasing the duty cycle of the driving signal for the first switch if a current provided by the battery charger is greater than the desired current; setting the flag indicating the battery is in the absorption charge stage when a voltage of the battery is greater than or equal a predetermined voltage and has been charging for a predetermined period of time, otherwise ending the charging process; if the battery is in the absorption charge stage, decreasing the duty cycle of the driving signal for the first switch if the voltage of the battery is greater than or equal to a predetermined voltage; increasing the duty cycle of the driving signal for the first switch if the voltage of the battery is less than the predetermined voltage; and stopping the charging process when the battery has been charging for more than a predetermined time.

According to yet another embodiment of the invention, computer-readable information storage medium for use with a computer controlling a high frequency charger comprising a charge circuit including a first high frequency transformer; a first switch switching the first high frequency transformer at a first frequency; a boost circuit including a second high frequency transformer; a second switch switching the second high frequency transformer at a second frequency, and a selector for selecting one of a charge mode for charging a depleted battery and a boost mode for supplying a boosting current to start a vehicle with the depleted battery, the computer-readable information storage medium storing computer-readable program code for causing the computer to perform the steps of: detecting a selected mode of operation; if the boost mode is selected, controlling the boost circuit to supplying a boosting current to the depleted battery; checking for a rapid rise in voltage after the vehicle has been started; if the rapid rise in voltage is present, indicating the alternator is working properly; and if the rapid rise in voltage is not present, indicating the alternator is not working properly.

According to yet another embodiment of the invention, a high frequency charger for charging a battery, comprises a charge circuit including a first high frequency transformer; a first switch switching the first high frequency transformer at a first frequency; a filter coupled to the first and second high frequency transformers for passing a DC voltage signal; means for coupling a resistance in parallel with the battery; means for measuring a voltage of the battery while the battery is coupled to the resistance; and means for correlating the measured voltage to a CCA value.

The above and other features of the invention, along with attendant benefits and advantages will become apparent from the following detailed description when considered with the accompanying drawings.

DETAILED DESCRIPTION OF THE INVENTION

Figure 1:
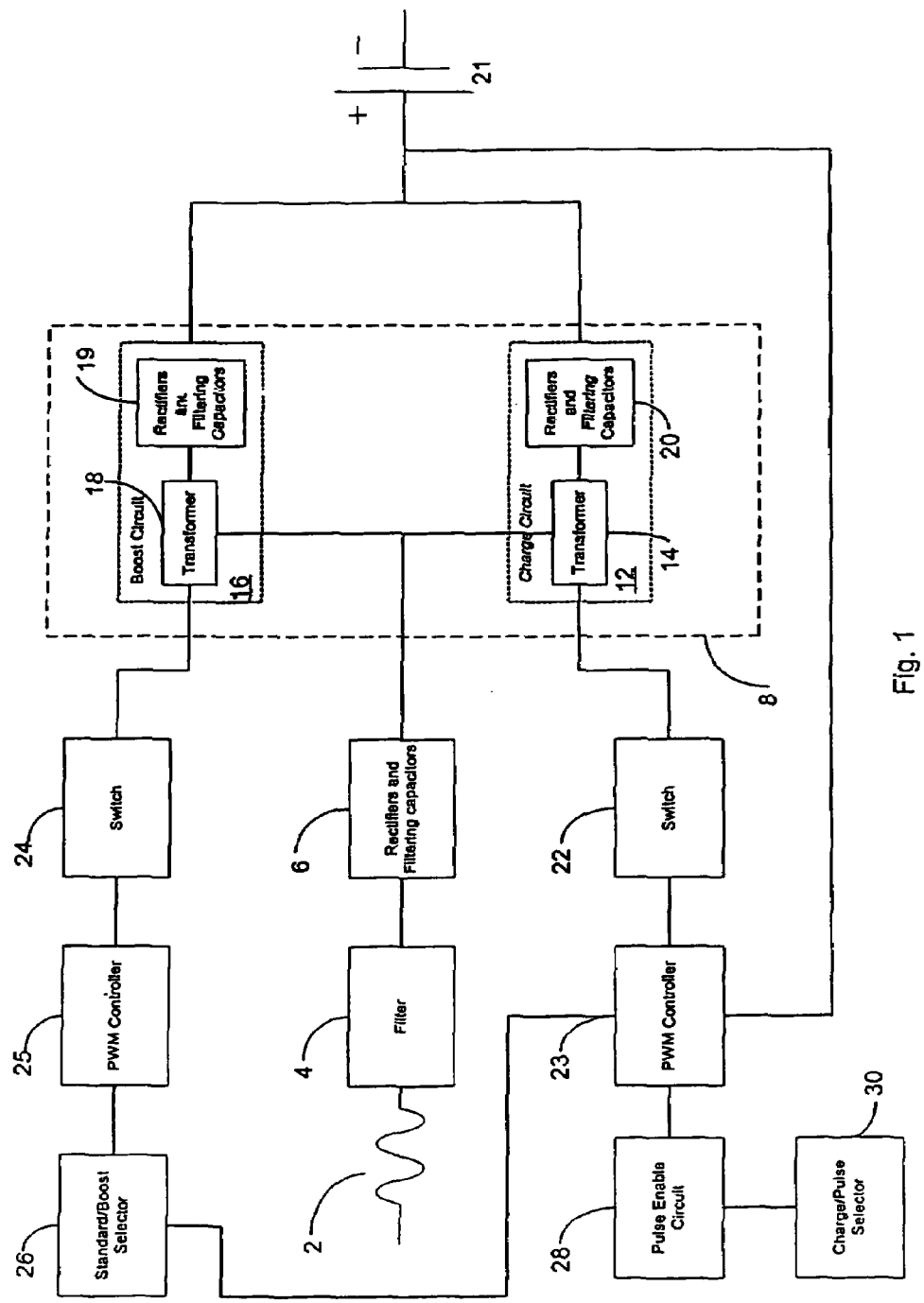
FIG. 1 is a block diagram showing a dual high frequency charger according to an embodiment of the present invention.

Referring now to FIG. 1, there is shown a high frequency charger, according one embodiment of the invention, which includes a high frequency transformer portion 8. The high frequency transformer portion 8 typically receives a DC signal as its input. The DC signal can be provided from a battery or from an AC input. In the embodiment illustrated, an AC input 2, which may be provided by a typical wall-socket, is coupled to a filter 4, for example, a pi filter or an LC filter. The filter 4 is used to smooth and clean the AC input. An AC signal output from the filter 4 is provided to conventional rectifiers and filtering capacitors 6 for rectifying the AC signal. The rectifier is preferably a full-wave rectifier of a type known to one skilled in the art and provides a DC output of, for example, approximately 150 volts DC.

The full-wave rectified and filtered DC output from rectifier 6 is provided to the high frequency transformer portion 8 of the battery charger. The high frequency transformer portion 8 includes a charge circuit 12 and a boost circuit 16. The boost circuit 16 is used to provide a high current boost that can be used to jump-start a vehicle with a dead battery. The charge circuit 12 is used for normal charging of the battery. The operation of the boost circuit 16 and the charge circuit 12 may take place sequentially, in any order, or simultaneously. The charge circuit 12 and the boost circuit 16 each include a high frequency transformer 14, 18, respectively. A DC output from the rectifiers and filtering capacitors 6 is provided to each of the high frequency transformers 14, 18.

Transformers typically receive an AC input and provide an AC output. For example, a transformer plugged into an ordinary wall-socket is provided with a 120-Volt AC input and outputs an AC signal that is dependent on the secondary winding of the transformer. Thus, high frequency transformers 14, 18 need to be manipulated to behave so that the DC signal from rectifiers 6 looks like an AC input. This manipulation is accomplished by switching the DC output from rectifier 6 through the high frequency transformers. The transformers are turned on and off at a high frequency, for example, about 20 kHz and above. This switching causes the transformers to behave as though their input is AC.

This switching can be accomplished using essentially any type of switch, for example, a field effect transistor (FET) or other electronic switch. The high frequency transformers 14, 18 of the illustrated embodiment are switched by switches 22, 24, respectively, coupled thereto. The switches 22, 24 are, in turn, controlled by PWM controllers 23, 25. The PWM controller may be, for example, a TL 494 Motorola type controller or a discrete controller. The PWM controller generates a PWM driving signal for turning the switches on and off.

The charge circuit 12 is capable of operation in two modes, a charge mode and a pulse mode. In the charge mode, the charge circuit 12 operates to charge a battery. In the pulse mode, the charge circuit 12 operates to condition or desulfate a battery. A user may select between one of these two modes via selector 30. The selector 30 provides the user's selection to a pulse enable circuit 28. The pulse enable circuit 28 controls the PWM controller 23 in accordance with whether the charge mode or the pulse mode of operation is selected for the charge circuit 12.

Figure 2:
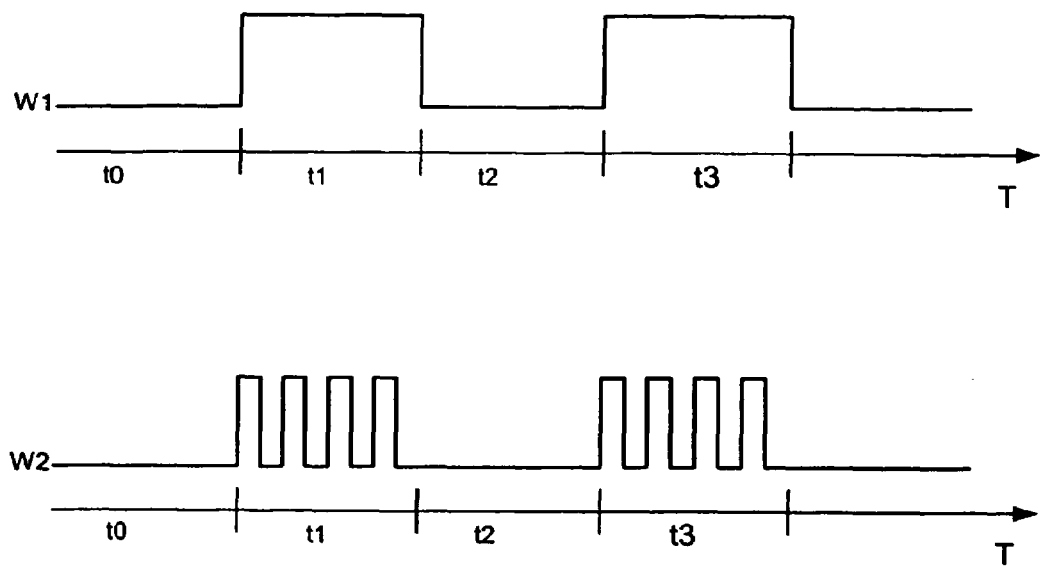
FIG. 2 is a diagram of waveforms generated by control circuits according to an embodiment of the present invention.

When the pulse mode is selected, the pulse enable circuit 28 controls the PWM controller 23 to alternately be active and output a driving signal to the switch 22 and be inactive and not drive the switch 22. A cycle of enabling/disabling the switching of the switch 22 is repeated under the control of the PWM controller 23. FIG. 2 illustrates exemplary output waveforms for the pulse enable circuit 28 and the PWM controller 23. In the pulse mode, the pulse enable circuit 28 is activated such that its output signal $W_1$ varies between low and high states as shown in FIG. 2. The PWM controller 23 is activated depending upon the output signal $W_1$ of the pulse enable circuit 28. During a first time period t1, the output $W_1$ of the pulse enable circuit 28 is high and the PWM controller 23 is activated to generate a PWM driving signal $W_2$, as shown in FIG. 2. The driving signal $W_2$ of the PWM controller 23 is provided to the switch 22, e.g., to the gate of a FET comprising switch 22, to turn it on and off. For example, the driving signal from the PWM controller 23 may have a duty cycle of less than 15% so that the FET is turned on for a very short period of time, outputs current to the battery, and is then disabled. The driving signal modulates the FET. During a second time period t2, the output $W_1$ of the pulse enable circuit 28 is low and the PWM controller is deactivated. No driving signal is provided to the FET, and the FET remains off. Pulsing of the high frequency transformer in this manner chops its output to condition the battery.

During the pulse mode, a series of output current pulses are generated by the battery charger and are provided to the discharged battery 21. The current pulses may have a frequency of about one pulse per second and a rise time of about 100 volts/microsecond or less.

When the charge mode is selected via selector 30, the PWM controller 23 is preferably always activated. Operation of the PWM controller 23 may be controlled in part via feedback from the battery 21 being charged. The duty cycle of the driving signal generated by PWM controller 23 is varied based on the charging state of the battery. A feedback signal from the battery being charged 21 to the PWN controller 23 provides the information on the charging state of the battery. The more power the battery needs, the higher the duty cycle; and the less power the battery needs, the lower the duty cycle. Switch 22 switches transformer 14 in accordance with the driving signal to charge the battery.

Referring again to FIG. 1, boost circuit 16 is now described. Boost circuit 16 provides a high current pulse that can be used to jump-start a dead battery. The boost circuit 16 is enabled via a standard/boost selector 26, which a user can actuate. When actuated, selector 26 enables PWM controller 25 to generate a signal that drives switch 24, which, in an exemplary embodiment, comprises a FET. The frequency of the driving signal for FET 24 in the high power boost circuit can be the same as or different from the frequency of the driving signal for switch 22 in the charge circuit, for example, about 20 kHz, or even higher. When the same frequency is used, the clock frequency for the PWM controller 23 associated with the charge circuit 12 to be shared by the PWM controller 25 for the high power boost circuit 16.

The high power boost circuit 16 receives a DC input from the rectifier 6. The DC input is provided to high frequency transformer 18 in the high power boost circuit 16. Preferably, the high frequency transformer 18 in the high power boost circuit 16 is separate from the high frequency transformer 14 in the charge circuit 12. The high frequency transformer 18 in the high power boost circuit 16 outputs a relatively high current with respect to the output of the charge circuit 12. For example, the current output from the boost circuit 16 may range from about 30 amps to about 500 amps, compared to about 2-25 amps for the charge circuit 12. Additionally, the output from the boost circuit 16 is typically only generated for a short period of time, for example, about 3-40 seconds. Accordingly, the high frequency transformer 18 in the high power boost circuit 16 is preferably slightly larger than the high frequency transformer 14 in the charge circuit 12.

The high frequency transformer 18 has a duty cycle such that it may be on half the time and off the half the time, even though there may always be an output from the transformer that is rectified, filtered and used to recharge the battery. The PWM controller 25 is typically turned off for about 60-90% of the time and is turned on for about 10-40%, and then it is turned back off again to achieve the duty cycle for the high frequency charger. During the 10-40% of the time the PWM controller 25 is on, switch 24 switches the high frequency transformer. This provides a high current pulse out of the high frequency transformer through rectifier 19 to the battery to be charged.

Both the transformer 14 in the charge circuit 12 and the transformer 18 in the boost circuit 16 output an AC signal that needs to be converted to DC in order to be used by the battery. Therefore, the output of the high frequency charger in the charge circuit passes through standard rectifiers and filtering capacitors 19, 20 to provide a DC output. The high frequency transformer 14 in the charge circuit 12 is preferably a relatively small transformer capable of delivering a relatively low current, preferably between about between 2 and about 30 amperes, and a voltage corresponding to whatever the battery needs, for example, about 14.2 volts. The switching operation for the high frequency transformer 18 in the high power boost circuit 16 by switch 24 is preferably performed in a manner similar to that described above with regard to the charge circuit 12 but, due to its different construction, results in a current output from the boost circuit from about 30 amps to about 500 amps.

Figure 3:
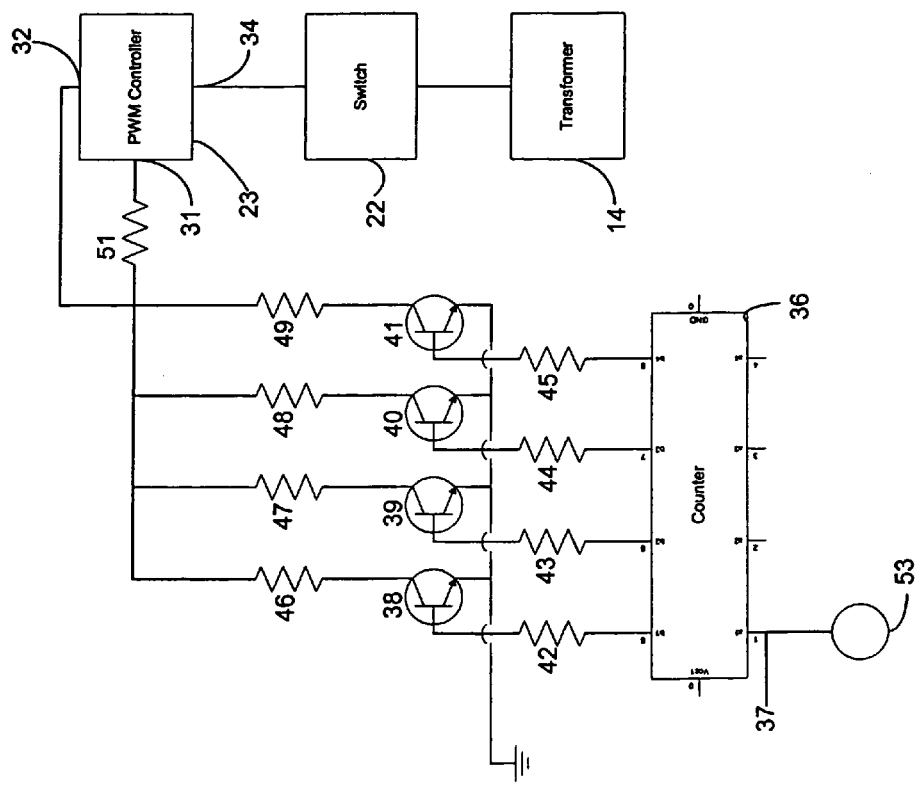
FIG. 3 is a circuit schematic in partial block diagram form showing an embodiment of the pulse enable circuit and the pulse width modulation controller shown in FIG. 1.

Turning now to FIG. 3, an example of circuitry that may comprise the pulse enable circuit 28 is described. In the illustrated embodiment, the pulse enable circuit 28 incorporates manual control of the PWM controller 23. A user can thus control the charging of the battery. The PWM controller 23 has an input 31 to which a reference voltage is applied, and a dead time control input 32. The dead time control input 32 controls the duty cycle of the driving signal from output 34 of the PWM controller 23 based on a percentage of the reference voltage that is applied to the dead time control input 32. For example, when the full reference voltage is applied to the dead time control input 32, the duty cycle of the output signal of PWM controller 23 is set to zero, the switch 22 (FIG. 1) is off, and no voltage is applied to the battery being charged. When no voltage is applied to the dead time control input 32, the duty cycle of the output signal of the PWM controller 23 is set to its maximum, and a maximum current is applied to the battery. The duty cycle of the driving signal from output 34 of the PWM controller 23 varies between these two extremes in dependence on the percentages of the reference voltage applied to dead time control input 32.

In the embodiment shown in FIG. 3, a combination of a counter circuit 36 and a number of transistors 38-41 is used to control the percentage of the reference voltage that is applied to the dead time control input 32. The counter 36 is preferably either a low active device with diodes or a high output active decade counter, for example a 4017B CMOS IC. Of course other arrangements are possible within the scope of the invention. Outputs of the counter 36 are each connected to transistors. Four transistors 38-41 for four outputs of counter 36 are shown in FIG. 3. The number of outputs and corresponding transistors may vary depending upon the type of counter used. Each transistor may be of a BJT or of a FET type. A control electrode of each transistor 38-41 is connected through a corresponding resistor 42-45 to a separate output of the counter 36. A first electrode in the main current path of each transistor 38-41 is coupled to ground. A second electrode in the main current path of each transistor 38-41 is coupled to a resistor 46-49, respectively. Each of the resistors 46-49 is coupled to the dead time control input 32 of the PWM controller 23. Each of the resistors 46-49 is also coupled to resistor 51, which is, in turn coupled to the reference voltage input 30 of the PWM controller 23.

The resistors 46-49, the associated transistors 38-41, and the resistor 51 form a voltage divider. The voltage difference between the reference voltage input 30 and the dead time control input 32 is controlled by the values of the resistors 46-49. For example, each of the resistors 46-49 can be selected to have a different resistance. The voltage drops across the resistors 46-49 will vary accordingly. Thus, the percentage of the reference voltage applied to the dead time control input 32 varies depending on which transistor 38-41 is turned on and the value of its associated resistor 46-49.

For example, as the counter 36 is clocked, one of the outputs of the counter 36 becomes active and turns on the respective transistor 38-41 connected to that output. Only one of the transistors 38-41 may be turned on at any one time. The turned on transistor 38-41 provides a current path from the dead time control input 32, through its respective resistor 46-49, to ground, thereby altering the voltage at the dead time control input 32 with respect to the voltage at the reference voltage input 30. Alternately, more than one of the transistors 38-41 is turned on.

A switch 53, such as a push button switch, may be coupled to a clock input 37 and used to clock the counter 36. For example, actuating the switch once clocks the counter 36 from the zero output to the first output, actuating the switch a second time clocks the counter 36 to the second output, and so on. As each output of the counter 36 becomes active, the transistor associated with that output turns on, altering the voltage at the dead time control input 32. Thus, the duty cycle of the driving signal from PWM controller 23 can be manually stepped through various levels.

Figure 4:
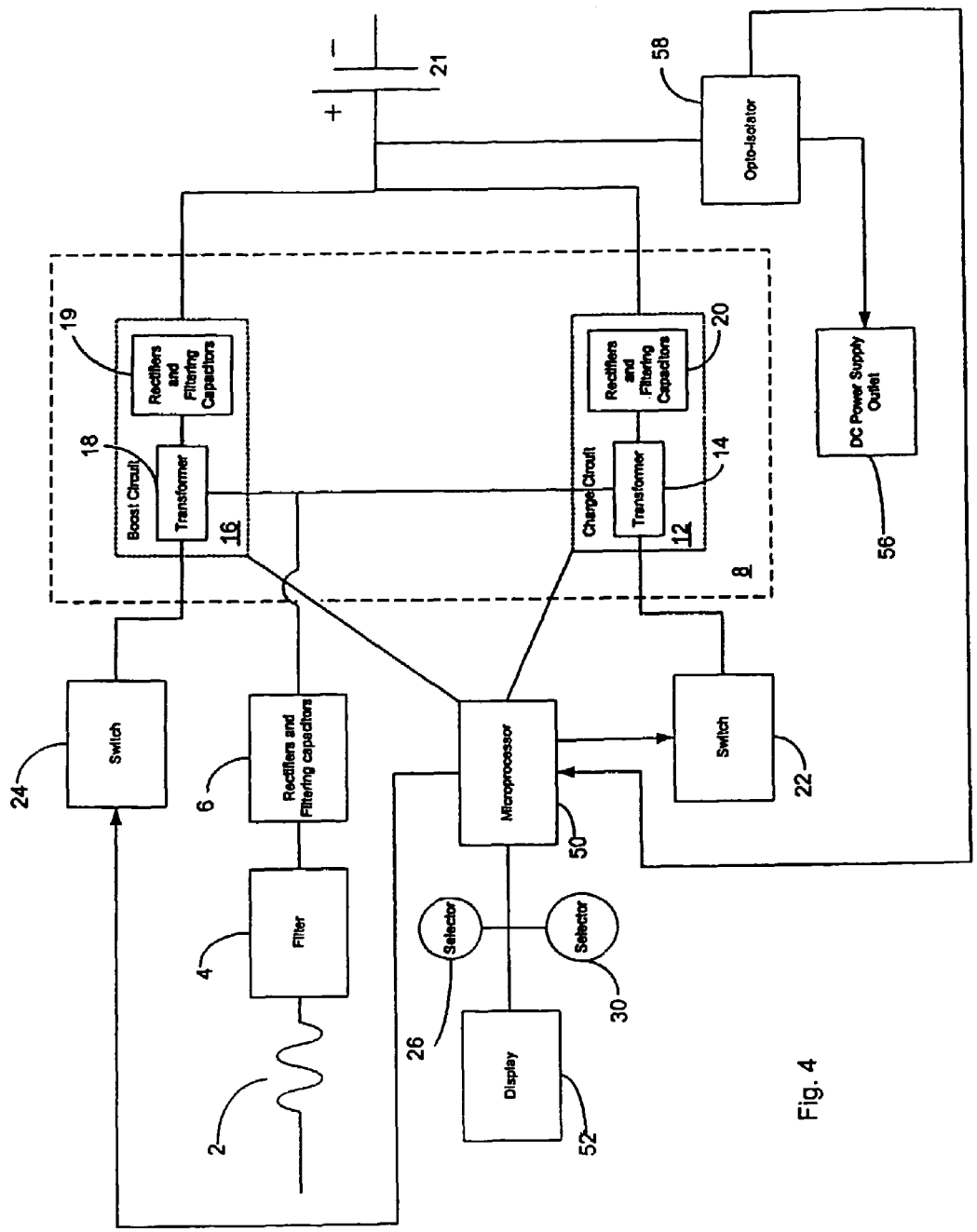
FIG. 4 is a block diagram of a battery charger according to a further embodiment of the invention.

FIG. 4 is a block diagram of a battery charger according to another embodiment of the present invention. The embodiment shown in FIG. 4 includes a microprocessor that controls many of the functions of the battery charger. The general operating principles of the battery charger are the same as for the previous embodiment and are not discussed in detail here.

In this embodiment, a microprocessor 50 is coupled to switches 22, 24, which may, for example, comprise FETs, and to the high frequency transformer portion 8. A display 52 is also coupled to the microprocessor 50. The display 52 is used to display various diagnostic and output information regarding the battery charger. User controls for turning the battery charger on and off, as well as the selectors 26, 30 (see FIG. 1) and the push-button switch 53 (FIG. 3) for controlling the operation of the battery charger in the step mode may also be coupled to the microprocessor 50.

The microprocessor 50 can be programmed to perform essentially all of the control functions needed for operation of the battery charger. For example, the microprocessor 50 can be programmed to control the charging process. When the charge/pulse selector 30 is actuated to select the charge mode, the microprocessor 50 receives this selection and controls the charging operation of the battery. This can be accomplished using the well-known negative delta V or other charge technique known to those of skill in the art. When the charge/pulse switch 30 is actuated to select the pulse mode, the microprocessor 50 receives this selection and controls the battery charger to perform the desulfation process. The microprocessor 50 may also include a timer such that the battery charger automatically shuts down after a predetermined period of time.

The microprocessor 50 can also monitor the charging operation. By way of a feedback circuit described below or other means, the microprocessor 50 can monitor the voltage and/or current being supplied to the battery from the battery charger and the voltage and/or current of the battery and can detect short circuits or other faults, as described in more detail below. A resistive divider may be used to provide the voltage and current measurements to the microprocessor's A/D input. A visual or audio indication of the faults is given, for example on display 52. A scrolling message describing the fault, a representative code, or other message may be displayed. The microprocessor 50 can also be programmed to control the actual pulse width modulation function. In this case, PWM controllers 23 and 25 (FIG. 1) can be eliminated and their functionality incorporated into the microprocessor 50.

In a further embodiment, the circuit shown in FIG. 4 may include a logic setting that allows the high frequency charger to provide a power supply 56. The power supply 56 may be accessed via a typical cigarette plug adapter provided on the battery charger.

FIG. 4 also illustrates a feedback circuit that may be provided to prevent the battery from being overcharged. The feedback circuit ensures that the proper amount of current is supplied to the battery. An opto-isolator 58 is coupled between the microprocessor 50 and the battery 21 being charged and provides information regarding the battery charging process to the microprocessor.

Figure 9:
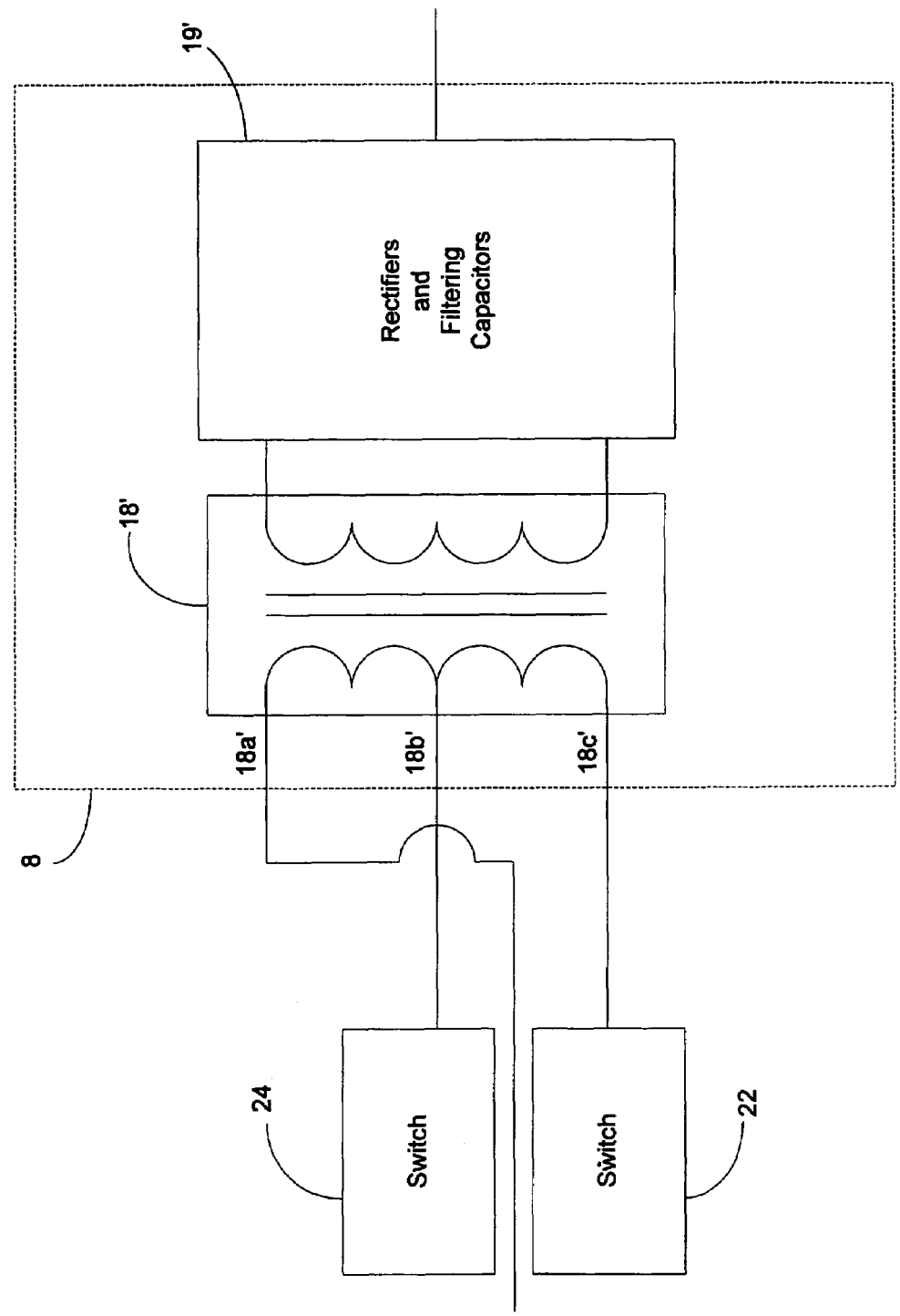
FIG. 9 is a partial block diagram showing an alternative implementation of the dual high frequency charger embodiments of FIGS. 1 and 4.

The embodiments shown in FIGS. 1 and 4 may be alternatively implemented by incorporating the apparatus of FIG. 9 to implement high frequency transformer portion 8. FIG. 9 shows the use of a single high frequency transformer 18' to implement the two high frequency transformers 14 and 18. Switching circuits 22 and 24 are tied to different taps (18c' and 18b', respectively) of the primary side of transformer 18'. Lead 18a' of transformer 18' is coupled to the DC current source formed by components 2, 4, and 6 of FIGS. 1 and 4. As shown, switching circuit 24 controls a tap 18b' corresponding to a winding that implements the transformer 14 of the charge circuit 12, while switching circuit 22 controls a tap 18c' corresponding to a winding that implements the transformer 18 of the boost circuit 16. The latter winding necessarily produces the high current output needed to provide the boost function. The rectifiers and filtering capacitors 19' replace components 19 and 20 of FIGS. 1 and 4. Other components of the apparatus are as shown in FIGS. 1 and 4.

Figure 5:
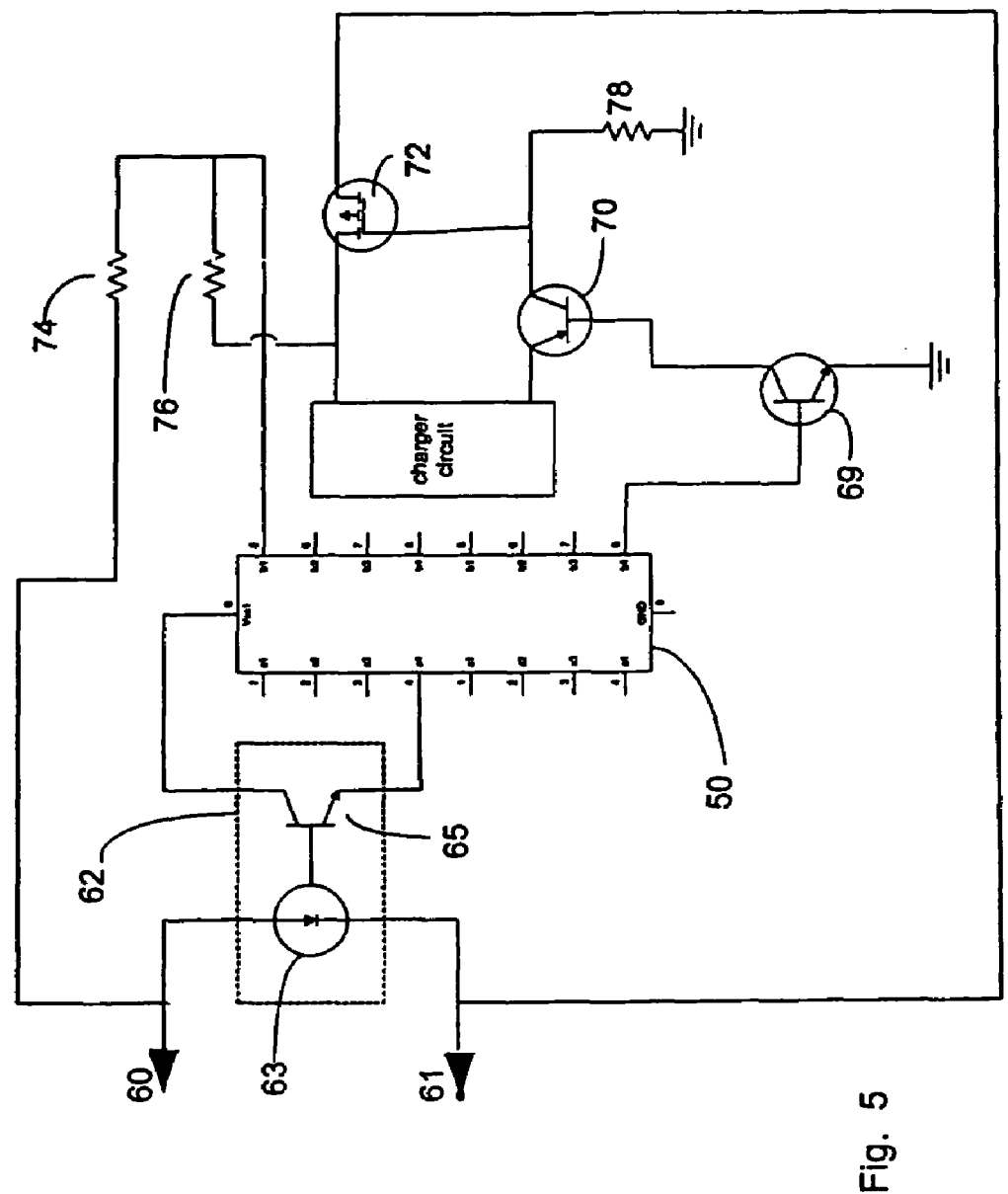
FIG. 5 is a block diagram of a battery charger according to a further embodiment of the invention.

Additional polarity and short-circuit protection circuitry can also be provided, as shown in the embodiment of FIG. 5. FIG. 5 is a partial schematic diagram of a battery charger showing only the short circuit and polarity protection elements to simplify the understanding of this embodiment. The other elements of the battery charger can be included as shown in FIGS. 1, 3, and 4.

In this embodiment, the battery charger is provided with a polarity detection circuit. Only when the polarity detection circuit detects that the battery has been connected to the battery charger with correct polarity is power supplied to the battery. Typically, the battery charger includes a pair of clamps 60, 61 for connection to the positive terminal and the negative terminal, respectively, of the battery to be charged 21. A polarity detection circuit detects the polarity of the connection of clamps 60, 61 and provides a signal to the microprocessor 50. In response to the signal from polarity detection circuit, the microprocessor controls the operation of the battery charger to supply power to the battery 21 or indicate an incorrect polarity accordingly.

In the embodiment illustrated in FIG. 5, the polarity detection circuit includes an opto-isolator 62 connected to clamps 60, 61 and to microprocessor 50. The opto-isolator includes a light-emitting diode (LED) 63 and a phototransistor 65. When the battery 21 is connected with correct polarity, clamp 60 is connected to the positive terminal and clamp 61 is connected to the negative terminal of the battery 21. LED 63 is then forward biased and turns on phototransistor 65. When the phototransistor 65 is turned on, it provides a logic high signal to a pin a4 of the microprocessor 50. The logic high signal indicates to the microprocessor 50 that a correct polarity connection has been made. Connecting clamp 60 to the negative terminal of battery 21 reverse biases the LED 63, and no signal is provided to the microprocessor 50.

In response to the logic high signal, the microprocessor 50 outputs a control signal to a control circuit for completing the connection between the battery charger and the battery 21. Here, the control circuit includes a transistor 72 coupled between one of the clamps 60, 61 and the charger circuit. Transistor 72 acts as a switch to connect battery 21 to the charger circuit. Only when switch 72 is closed will transistor 69 complete the connection between the battery charger and the battery 21. The opening and closing of transistor 72 is controlled via transistors 69 and 70. A control electrode of transistor 69 receives the control signal from the microprocessor. When the control signal is received, transistor 69 turns on, which, in turn, turns on transistor 70. Current flow through transistor 70 activates a control electrode for transistor 72 and turns transistor 72 on, completing the circuit between the charger circuit and battery 21. Only when the control signal is provided to transistor 69 is it possible for transistor 72 to be turned on.

Once a correct polarity connection has been established, the transistor 72 may remain on even after clamps 60, 61 are disconnected from the battery 21. The disconnected clamps are thus still powered-up. Therefore, a means for detecting the presence of a battery at the clamps may be provided. The microprocessor 50 can be programmed to detect when the clamps 60, 61 have been disconnected and, in response, turn transistor 72 off. A voltage divider comprised of resistors 74 and 76 is provided for this purpose. The voltage divider divides the voltage across the clamps 60, 61 and provides a portion of this voltage to the microprocessor 50. When the clamps are disconnected from the battery 21, the voltage across the clamps 60, 61 will greatly increase. The voltage provided by the voltage divider will also increase in a corresponding manner. When the voltage provided to the microprocessor 50 exceeds a selected amount, for example, 18 volts, the microprocessor 50 detects that the clamps 60, 61 have been disconnected and immediately turns off transistors 69 and 70, which turns off transistor 72. Various resistors, such as resistor 78, may also be included in the circuit.

According to another embodiment of the invention, the means for detecting the presence of a battery at the clamps may detect the presence of a current flowing through the clamps 60, 61, instead of, or in addition to the voltage across the clamps. The presence of a current flowing through the clamps 60, 61 may indicate whether the clamps 60, 61 are connected to a battery. A current flows through the clamps when they are connected to a battery and no current should flow through the clamps when they are not connected to a battery. The microprocessor 50 is adapted to detect the current flowing through the clamps 60, 61. When no current is detected, the microprocessor 50 detects that the clamps 60, 61 have been disconnected and immediately turns off transistors 69 and 70, which turns off transistor 72.

The means for detecting the presence of a battery at the clamps may also be used to detect a bad battery or a battery whose voltage is too low to be charged. Normally, even a dead battery has some voltage, usually about 3-5 volts. Occasionally, however, a battery does not have any voltage as it is so deeply discharged that the battery is totally dead. This type of battery cannot be immediately charged, if it can be charged at all. When the clamps of the battery charger are connected to this type of battery, it is as if the battery charger is not connected to anything. As the voltage of such a battery is extremely low, the microprocessor 50 does not detect any voltage across the clamps. A fault is displayed if an attempt is made to charge the battery. This type of fault will also occur if no connection or a poor connection is made to the battery 21 and the charger is activated. When the fault occurs, the microprocessor 50 can be programmed to display a suggestion to a user that the battery be reconditioned before charging is attempted or to check if the clamps are connected to a battery.

In another embodiment of the invention, the microprocessor 50 is programmed to determine the cold-cranking amps (CCA) available from the battery 21. CCA is the amount of power exerted by a battery when starting a vehicle on a cold day. The definition by Battery Council International (BCI) is the discharge load in amperes which a new fully charged battery at 0 degrees Farenheit can deliver for 30 seconds and maintain a voltage of 1.2 volts per cell or higher.

CCA is determined in the described embodiment by connecting a resistance in parallel with the battery 21. The resistance should be connected for a short period of time so not to drain the battery. The voltage of the battery is determined when under the load of the resistance. The lower the voltage of the battery under the load, the lower the CCA of the battery. The microprocessor is programmed to correlate the measured voltage to a CCA value. The CCA value may then be displayed to the user.

Figure 6:
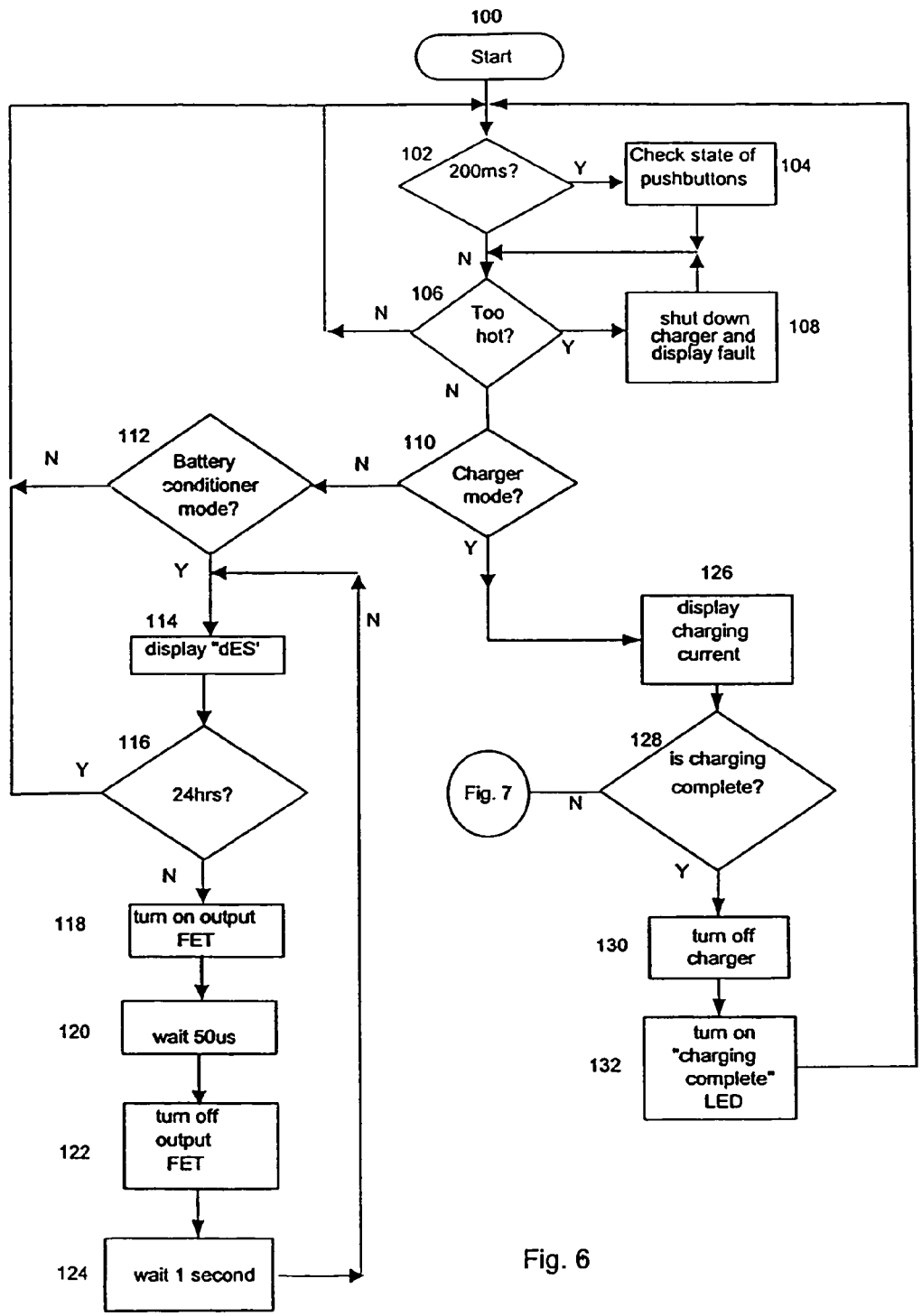
FIGS. 6 and 7 are flow diagrams of a method according to an embodiment of the invention.
Figure 7:
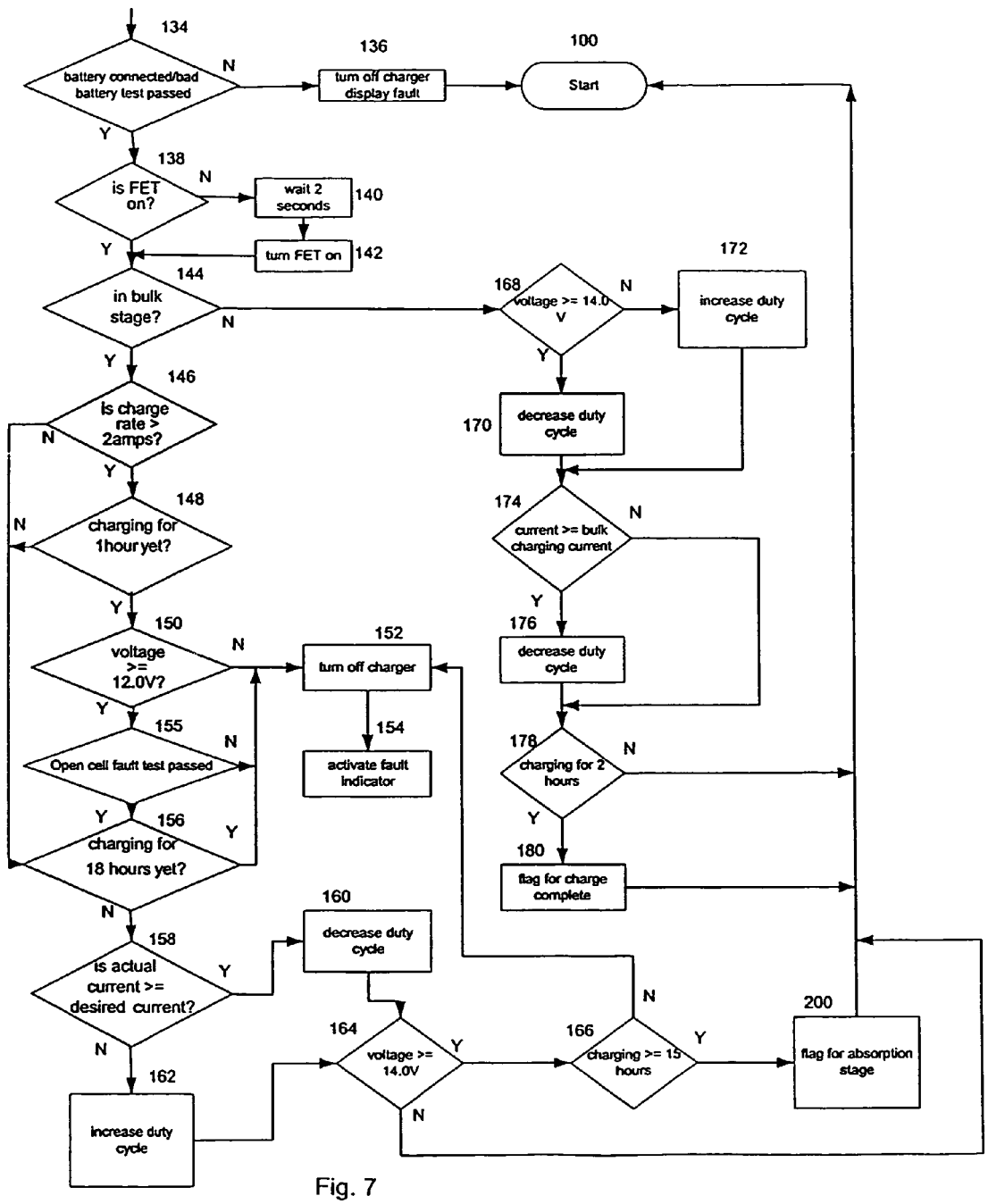

Turning now to FIGS. 6 and 7, here are illustrated flow diagrams of a software program that can be used to control the operation of the microprocessor according to an exemplary embodiment of the present invention. At the start of the program, the battery charger is initialized, steps 100-108. The microprocessor checks the state of the various user controls that may be provided on the battery charger. These controls may include, for example, the charge/pulse selector 30, the boost selector 26, and any other user controls. The state of the input controls is checked after a predetermined period of time has passed, for example, 200 microseconds, in order to allow the control signals to reach the microprocessor. During this initialization process and throughout the charging process, the microprocessor can detect various faults with the battery charger. For example, the battery charger may be provided with a temperature sensor that can detect the temperature of the battery. If the temperature of the battery is above a prescribed temperature, the microprocessor determines that the battery is overheated and shuts down the battery charger. A fault message may also be shown on display 52 indicating the overheated condition. If the sensed temperature is below the prescribed limit, the charging process proceeds.

Next, the microprocessor determines which of the operating modes (charging, pulsing, boosting, etc.) has been selected, steps 110-112. In the embodiment shown in FIGS. 6 and 7, the processes for the charging mode and the battery-conditioning mode are illustrated. If none of the available operating modes has been selected, the process returns to the initialization step and checks the state of the input controls again.

Once an operating mode is selected, that selection may be shown to the user via display 52. For example, if the battery-conditioning mode has been selected, this selection is shown to the user via display 52, step 114. The battery conditioning mode is then begun. A timer is checked to determine if the battery charger has previously been operating in the battery-conditioning mode for a predetermined period of time. In this embodiment, it is checked if the battery charger has been operating in the battery-conditioning mode for 24 hours. If the charger has been operating in the battery-conditioning mode for greater than 24 hours, the battery conditioning process is complete and the process returns to the initialization step 102. If the battery conditioning process has been ongoing for less than 24 hours, the battery conditioning process continues. The battery charger pulses the battery to perform the conditioning. The switching of the FET switch 22 is controlled to generate the conditioning pulses, steps 118-124. For example, the microprocessor may enable the PWM controller 23 to switch the FET on and off for a period of time, about 50 microseconds. The PWM controller 23 is then turned off, disabling the FET switch 22. The FET is not switched when the PWN controller 23 is off. The PWM controller 23 may remain off for about 1 second. The process then returns to the step 114 and repeats until the battery conditioning operation has been performed for 24 hours, at which time the battery conditioning process is completed.

When the microprocessor detects that the charge mode has been selected, the process proceeds to step 126. Here, the charging current being supplied to the battery 21 is shown to the user via display 52. The microprocessor detects if the charging process is complete. This may be done by checking if a flag indicating that the charging process is complete is set. If the charge complete flag is set, the charger is turned off and a charge complete indicator, for example, an LED, is activated to indicate to a user that charging is complete. The process then returns to the initialization stage and awaits further instructions via the user input, steps 128-132.

If the charge complete flag is not set, the process proceeds to step 134 (in FIG. 7) and detects if a battery is connected to the charger. This check can prevent current from being supplied from the battery charger unless a battery is connected to the battery charger, preventing a potentially hazardous situation. The means for detecting the presence of a battery at the clamps discussed above in connection with FIG. 5 can be perform this check. Additionally, the process for detecting a bad battery or a battery that has a voltage too low to be charged as described above may also be performed at this time. If a bad battery, a low voltage battery or no battery is detected, a fault is displayed; the charger may then be disabled in step 136, and the process returns to the initialization stage.

When a connection to a battery is detected, the microprocessor enables PWM controller 23 to generate a driving signal for FET switch 22, steps 138-142. If the charging process has already been initiated, these steps may be skipped. Next, it is determined if the battery charger is operating in a bulk charging mode or an absorption charging mode. This determination is made by examining an absorption stage flag. If the absorption stage flag is set, the battery is in the absorption charging mode, and the process proceeds according to step 168. If the absorption stage flag is not set, the battery is still in the bulk charging mode. The process then proceeds with step 146 to continue the bulk charging mode and to determine when the bulk charging mode has been completed.

Additional fault checks may be performed at this time to ensure the charging operation is proceeding correctly, steps 146-154. The fault checks may also be performed at other times during the process. The microprocessor can detect various faults, including a shorted cell battery, an open cell battery, and an overtime allowed for the charging process, among others. Various measurement means are provided to measure the required parameters and to supply this information to the microprocessor.

If a battery has a shorted cell, it is unlikely that the battery voltage will increase as it is attempted to charge the battery. However, charging must be attempted for some period of time before it can be determined if the battery has a shorted cell. The microprocessor can be programmed to monitor the voltage, current, and time of charging to detect a shorted cell. If a charge rate is greater than a predetermined current, the battery has been charging more a predetermined amount of time, and the voltage of the battery is less than or equal to a predetermined voltage, a shorted cell is detected. For example, if the charge rate of the battery is greater than 2 amps, the battery has been charging for more than 1 hour, and the voltage of the battery is less than or equal to about 11 volts, the charger is turned off, and a shorted cell fault is indicated to the user.

The process for detecting an open cell battery is similar to the process for detecting a shorted cell battery. An open cell battery has some voltage due to leakage between the open cell and its connectors. However, the open cell battery does not have the ability to either accept or deliver current. When the battery charger is connected to an open cell battery, the microprocessor detects a voltage at the clamps of the battery charger, but when the charging process begins, no appreciable current is detected. If no current is detected after a predetermined period of time, for example five minutes, an open cell battery is detected and the appropriate fault displayed. If an open cell or shorted cell fault is not detected, the process may proceed to step 156.

Step 156 determines if the battery has been charging for an extended period of time, yet the charging process is not complete, an overtime fault. There may be situations when the voltage of a battery increases during charging, in contrast to a shorted cell battery, but the battery is not fully charged within a predetermined period of time. This can happen, for example, on a very large battery which is being charged at a very low current rate. A 100 amp hour battery cannot be charged with a change rate of 2 amps in a reasonable amount of time. Therefore, the charge rate is too low to finish charging in a reasonable period of time and a fault is indicated. Additionally, another type of failure mode in a battery can cause this same circumstance, that is, a battery with a severe internal leakage.

An overtime fault occurs if a predetermined voltage is not reached within a predetermined time period, yet the called for current is still flowing. When these conditions are met, an overtime fault is indicated on the display For example, referring to steps 150-156 of FIG. 6, it is determined if the battery has been charging for over 18 hours. If so, the battery has been charging a substantial period of time, and yet the battery voltage is not over 12 volts, per step 150. Thus, a fault is detected and the process proceeds to step 152, where the charger is turned off, and then to step 154, where a fault is indicated.

If the battery has not been charging for 18 hours, the process continues with step 158. Step 158 utilizes feedback from the battery to adjust the duty cycle of the signal driving the FET 22. If the actual current being provided from the battery charger is greater than or equal to the desired current, the duty cycle of the driving signal is decreased, step 160. If the actual current is less than the desired current, then the duty cycle of the driving signal is increased, step 162.

Next, it is determined if the voltage of the battery is greater than or equal to a predetermined voltage, for example, 14 volts, for at least a predetermined period of time, for example, 2 seconds, step 164. If the voltage of the battery has not been greater than or equal to 14 volts for at least 2 seconds, the process returns to the initialization stage. On the other hand, if the voltage of the battery has been greater than or equal to 14 volts for more than 2 seconds and the battery has not been charging for a predetermined time, for example 15 hours (step 166), a fault is indicated, and the process proceeds to steps 152 and 154. Otherwise, the process proceeds to step 200 and the flag for the absorption stage is set. The process then returns to the initialization stage and begins again.

If a flag for the absorption stage has been set, the process proceeds from step 144 to step 168. If the battery voltage is greater than or equal to the predetermined voltage, for example, 14 volts, the duty cycle of the driving signal is decreased. If the voltage is less than 14 volts, the duty cycle of the driving signal is increased, steps 168-172. Next, it is determined if the current of the battery is greater than or equal to the bulk charging current. If the current is greater than or equal to the bulk charging current, the duty cycle of the driving signal is decreased, otherwise no change to the duty cycle is made, steps 174-176. A check is then performed to determine if the absorption charge mode is complete. If the voltage of the battery is greater than or equal to a predetermined voltage, for example 14 volts, and the battery has been charging for a predetermined time, for example 2 hours, the absorption charge mode is complete and the flag for a complete charge is set, steps 178-200. The charging process is complete, and the process then returns to the initialization stage and awaits further instructions.

The microprocessor 50 may also be used to conduct a test of an alternator of a vehicle with a depleted battery. When the alternator of a vehicle is working properly, the voltage level of the discharged battery 21 rises rapidly immediately after the battery is jump-started. The rapid rise in voltage can be detected by the microprocessor 50 based on the signals the microprocessor receives from opto-isolator circuit 62. If a rapid rise in voltage is detected, a message that the alternator is working properly may be shown on display 52. If no rapid rise in voltage is detected, then a message that the alternator is malfunctioning may be shown on display 52. The rapid rise in voltage may vary depending on how depleted the discharged battery is. The microprocessor should be programmed to account for this variance.

Another fault that may be detected by the microprocessor is an overheated charger. The charger may become overheated due to restricted airflow or an internal failure. A temperature sensor that measures the internal temperature of the charger can be coupled to the microprocessor. When the microprocessor detects that the temperature of the internal electronics of the battery charger is too high, a fault is detected and shown on display 52.

In a further embodiment of the invention, a method of electrically testing a connection between the battery charger and the battery to be charged is provided. The method enables this connection to be tested before high current levels that may result in a spark or arcing are available. According to this embodiment, an amount of current less than the total available charging current is initially provided from the battery charger. It is then determined if this smaller amount of current is present at the battery being charged. If so, the current level provided from the battery charger is gradually increased, for example, in a step wise manner or according to a ramp function. The current provided from the battery charger is checked at various increments to determine if the current provided from the battery charger is present at the battery being charged. If the current from the battery charger is present at the battery being charged, the increase of the current continues until the desired charging current is reached. If, at any point during the increase of current, the current from the battery charger is not present at the battery being charged, a fault may be detected. When a fault is detected, the current from the battery charger can be reduced to a lower, safer level that does not produce a spark or arcing.

Figure 8:
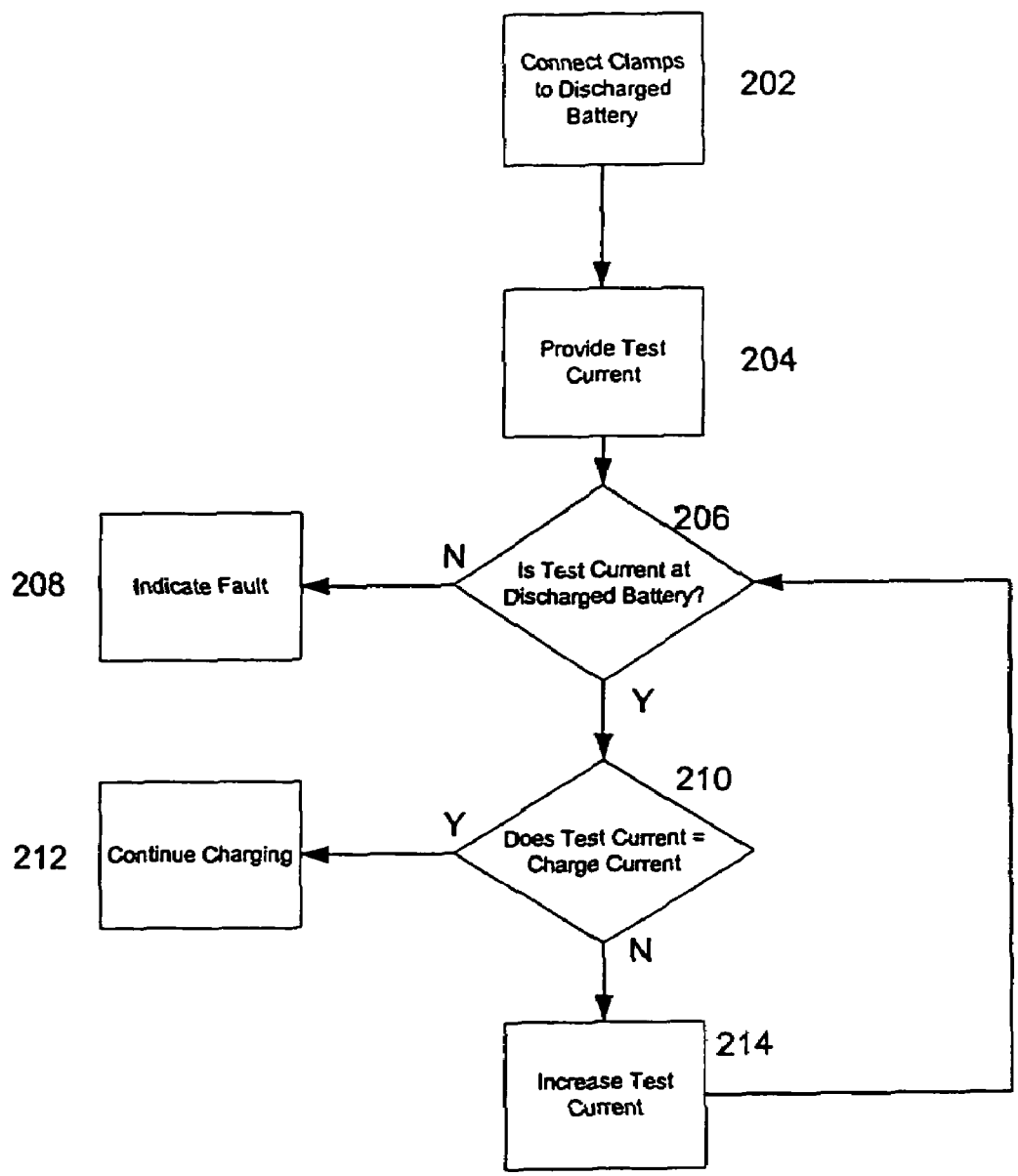
FIG. 8 is a flow diagram of a method according to another embodiment of the invention.

A flow chart relating to this embodiment of the invention is illustrated in FIG. 8. First, the battery charger is coupled to the battery being charged, per step 202. The battery charger may have an available output current of about 6 amps, for example. Initially, a far lower current, for example, 0.5 amp, is provided from the battery charger as a test current, step 204. In step 206, a test is performed to detect the presence of the 0.5 amp test current at the battery being charged. If the test current is not detected, a fault is indicated, and the charging process may stop, per step 208. In step 210, it is determined if the test current is equal to the desired charging current. If so, the charging continues at the desired charging current, step 212. Otherwise the process proceeds to step 214. In this case, the 0.5 amp test current is present at the battery being charged, and the current provided from the battery charger is increased to the next level, for example, 0.75 amps. The process then returns to step 206 to detect the increased current. Stepping or ramping up the current in this manner detects a faulty connection between the battery charger and the battery being charged prior to high currents that can produce sparks being provided to the battery. The microprocessor may be programmed to operate the battery charger in this manner.

Accordingly, a high frequency charger and method of operating a high frequency charger are provided. The use of high frequency transformers provides several advantages. For example, as long as the switching frequency is high enough, iron is not needed for the core of the transformers. A very light substance, for example, ferrite, can be used, greatly reducing the weight and unwieldiness of known devices. Additionally, the secondary winding of the transformers may have a small number of windings, for example, as few as four turns of wire. In comparison, a conventional transformer can require over 100 turns of wire. The higher the frequency, the less wire is needed, further reducing the cost required to manufacture the device.

The embodiments illustrated and discussed in this specification are intended only to teach those skilled in the art the best way known to the inventors to make and use the invention. Nothing in this specification should be considered as limiting the scope of the present invention. The above-described embodiments of the invention may be modified or varied, and elements added or omitted, without departing from the invention, as appreciated by those skilled in the art in light of the above teachings. It is therefore to be understood that, within the scope of the claims and their equivalents, the invention may be practiced otherwise than as specifically described. For example, the processes described above may be performed in an order different from that described above.

What is claimed is:

1. A high frequency battery charger for charging a target battery, comprising:
a charging circuit including a high frequency transformer, a switch switching the high frequency transformer, a filter coupled to the high frequency transformer for passing a DC voltage signal and a controller providing a high frequency driving signal to the switch;
measuring circuitry for measuring at least one of a voltage or a current at the target battery; and
a microprocessor receiving the measured voltage or current and calculating diagnostics of the target battery based on at least one of the measured voltage or current, wherein the microprocessor is programmed to: provide a test current that is lower than a charging current from the battery charger to the target battery; detect if the test current is present at the target battery; indicate a fault if the test current is not detected at the target battery; and increase the test current a predetermined amount and return to the detecting step if the test current is detected at the target battery.

2. The charger of claim 1, further comprising connectors coupled to the charging circuit and adapted to be connected to the target battery for providing the DC voltage signal to the target battery, the measuring circuitry being coupled to the connectors to measure at least one of the voltage or the current.

3. The charger of claim 1, wherein the diagnostics include at least one of an overtime fault, a shorted cell fault, a bad battery fault, or an open cell fault.

4. The charger of claim 1, wherein the microprocessor determines a charging time of the target battery.

5. The charger of claim 4, wherein the microprocessor detects the overtime fault in dependence on the charging current being greater than a predetermined current, the charging time being longer than a predetermined time, and the voltage of the battery being less than or equal to a predetermined voltage after the predetermined time.

6. The charger of claim 5, wherein the predetermined current is 2 amps, the predetermined time is 18 hours and the predetermined voltage is 12 volts.

7. The charger of claim 4, wherein the microprocessor detects the shorted cell battery fault in dependence on the battery voltage being less than or equal to a predetermined voltage after a predetermined time.

8. The charger of claim 7, wherein the predetermined time is 1 hour and the predetermined voltage is 11 volts.

9. The charger of claim 3, wherein the microprocessor detects the bad battery fault when no target battery voltage is measured.

10. The charger of claim 3, wherein the microprocessor detects the open cell battery fault in dependence on at least the charging current being less than a predetermined current after a predetermined time.

11. The charger of claim 1 further comprising:
means for coupling a resistance in parallel with the battery; and
means for correlating the measured.voltage to a cold cranking amps (CCA) value.

12. The charger of claim 3 further comprising a display for displaying representations corresponding to the calculated diagnostics.

13. The charger of claim 12, wherein the representations include fault codes.

14. A high frequency battery charger for charging a target battery, comprising:
a high frequency transformer;
means for switching the high frequency transformer;
means coupled to the high frequency transformer for passing a DC voltage signal;
means for providing a high frequency driving signal to the switch;
means for measuring at least one of a voltage or a current at the target battery; and
means for receiving the measured voltage or current and calculating diagnostics of the target battery based on at least one of the measured voltage or current, wherein the means for receiving and calculating provide a test current that is lower than a charging current from the battery charger to the target battery; detect if the test current is present at the target battery; indicate a fault if the test current is not detected at the target battery; and increase the test current a predetermined amount and return to the detecting step if the test current is detected at the target battery.

15. The charger of claim 14, further comprising connecting means adapted to be connected to the target battery for providing the DC voltage signal to the target battery, the means for measuring being coupled to the connecting means to measure at least one of the voltage or the current.

16. The charger of claim 14, wherein the diagnostics include at least one of an overtime fault, a shorted cell fault, a bad battery fault, or an open cell fault.

17. The charger of claim 14, wherein the means for receiving and calculating determines a charging time of the target battery.

18. The charger of claim 17, wherein the means for receiving and calculating detects the overtime fault in dependence on the charging current being greater than a predetermined current, the charging time being longer than a predetermined time, and the voltage of the battery being less than or equal to a predetermined voltage after the predetermined time.

* * * * *